Patented Nov. 7, 1933

1,934,640

UNITED STATES PATENT OFFICE 1,934,640

SATIN WHITE

Harold Robert Rafton, Andover, Mass., assignor to Rafton Engineering Corporation, a corporation of Massachusetts No Drawing. Application July 18, 1930
Serial No. 468,987

5 Claims. (Cl. 91—68)

My invention relates to an improved satin white.

The principal object of my invention is to provide an improved satin white and paper coated therewith.

An important object is to provide an improved satin white the particle sizes of which are more homogeneous than those of the satin white from which it was produced.

A further object is to provide an improved satin white, the distribution of particle sizes of which is more limited than that of the satin white from which it was produced.

A further object is the production of an improved paper coated with homogenized satin white.

Other objects and advantages will become apparent during the course of the following description.

Satin white is customarily made by the action of alum on lime, the lime being normally in excess. High calcium lime is usually employed, although at times lime containing magnesia has been employed for the purpose. Likewise on occasion calcium carbonate has been substituted for lime. Alum also has sometimes been substituted in whole or in part by other metallic salts but normally alum is the material used. Formerly it was the practice to use the true alums or double salts such as potash or ammonium alums but at the present time aluminum sulphate or alum is almost universally employed. Sometimes Glauber's salts (i. e. sodium sulphate with water of crytallization) is added in addition to the alum.

The composition of satin white is sometimes considered to be calcium sulphate and aluminum hydroxide usually with an excess of calcium hydroxide, but certain evidence has been adduced which indicates that in some cases the composition may better be considered as a mixture of calcium sulphate and calcium aluminate, possibly with excess free lime. It will be understood that the material may vary from these compositions according to the raw materials used as explained above, according to the proportions in which the raw materials are used, and according to the method of manufacture employed.

Either of two methods are normally employed for the manufacture of satin white, which may be termed respectively the "thick" method and the "thin" method. The thick method consists in slaking lime into a relatively thick mud and then mixing this mud in a kneader or strongly constructed agitating vessel with lump or powdered alum, the alum being added usually in several stages, with intermittent water additions if desired as made necessary by the thickening of the mix. In the thin method the lime is slaked to a fluid milk and acted upon in a suitable container, preferably with agitation, either by powdered alum or preferably by alum in solution.

In the thick process it is customary to thin down the mix after reaction has been completed and to sieve it through a fine mesh wire cloth, usually 150 mesh, but sometimes 200 mesh is employed. The material is then dewatered as by filter pressing. In the thin method similar screening may be effected either on the original lime milk or on the reaction product or both, and the final reaction product is then dewatered as in the thick process.

As will be apparent there is always present in either method of manufacture a greater or lesser proportion of the base, that is the lime, as a solid phase during at least part of the reaction, and of course there is coincidentally present a certain amount of the base in dissolved condition. It is thus obvious that perfectly uniform crystal size cannot be expected to result under such conditions, such as would be the case if two clear solutions were caused to react. There will obviously be present certain crystals larger than the average, probably because of being formed on nuclei of the base, and in addition there will be more or less larger particles of slaked lime present, whether or not these be converted into the other compounds by surface action. Examination of various satin whites under the microscope confirms these statements. Satin white appears to consist of a more or less gelatinous mass interspered with very fine crytals which for the most part appear to be of uniform size. The gelatinous material is difficult to see unless it is colored suitably. In addition to the crystals of uniform size there are normally present a certain number of larger crystals, and also a certain number of particles apparently of non-crystalline form varying from the finest up to particles which would just pass through the mesh used in processing the satin white. It is thus seen that satin white is not a material whose particles (excluding the gelatinous material) are strictly of a homogeneous size as produced, for in addition to the apparently gelatinous material and the fine crystals which constitute the large bulk of the product there exist certain relatively coarser crystals and a certain proportion of presumably non-crystalline material of varying particle sizes. I term the relatively uniform size crystals the "ultimate" particles of the satin white, although of course this term could be more strictly applied to the gelatinous mass which makes up a large proportion of the satin white. Inasmuch, however, as this gelatinous mass is not resolvable under the microscope into individual particles, the term "ultimate" particles will be reserved for the finely divided crystalline material present. In addition to the ultimate particles, the satin white contains particles ranging from the size of the ultimate particles up to the size of particles which have just passed through the mesh used in processing the material, either 150 or 200 mesh as the case may be.

For convenience I divide these remaining particles into two groups, the first of which I term "oversize" particles and the second of which I term the "intermediate".

I have found that there are certain difficulties inherent in the use of ordinary satin white for coating paper, and by careful study have determined that such difficulties arise from the presence in the satin white of the intermediate and oversize particles. I have found particularly that the difficulties are due to the presence of what I call the oversize particles, that is, particles larger than the certain limiting size, which size so far as I am aware has not been previously determined. By experimentation I have determined however that this limiting particle size is approximately .001". All particles in the satin white which are greater than approximately .001" I have termed oversize particles whereas all particles between the oversize and the ultimate I have termed "intermediate", and in this description and appended claims the terms oversize and intermediate are to be considered as having the above defined meanings.

I have found that the oversize particles are very deleterious in satin white use for coating paper as they cause lumps in the coating of the paper with subsequent dusting during the drying, reeling and calendering operations, and are a cause of unevenness of finish and non-uniformity of the printing qualities of the resulting paper.

The intermediate particles are not detrimental in the sense that the oversize is detrimental, but the percentage of them present as well as their average size influence the general characteristics imparted to coated paper by satin white.

It is thus evident that reduction of oversize particles in satin white is greatly to be desired. Attempt has been previously made to reduce the so-called "grit" in satin white by grinding as in a pebble mill and this method if carried far enough will completely reduce and thus eliminate the oversize. But in so doing it also reduces the other particle sizes, that is, the intermediate and the ultimate, with the result that the general characteristics of the satin white are profoundly modified which in certain cases is very undesirable. The effect of such grinding is not to render the satin white completely homogeneous as to particle size but rather to move the curve of particle size distribution toward smaller sizes, each particle being progressively reduced. Furthermore the grinding method has the disadvantage of discoloring the satin white especially in the case of the severe treatment required to completely reduce all the oversize. Other methods such as elutriation and hydroseparation have been tried in an attempt to remove the oversize of satin white, but these methods do not remove sufficient oversize so that a suitable quality of satin white may be produced thereby. Moreover the best types of apparatus required for such methods are very large and expensive, require excessive floor space and involve reconcentration of solids from the necessarily dilute suspensions in which hydroseparation is required to be effected. Air flotation methods are likewise not feasible because not only do they not produce the quality of material desired, but also such methods require drying, and this is not only costly but produces a material which is extremely difficult if not virtually impossible to bring back to its original colloidal condition when desired for use.

I have devised, however, two methods by which the oversize of satin white can be substantially reduced if not substantially completely eliminated in the wet condition, namely by passage through a special type colloid mill such as is disclosed in my copending application Serial No. 459,816, filed June 7, 1930, or by passage through a homogenizer which process I disclose in my copending application Serial No. 468,984, filed July 15, 1930. Both the special type of colloid mill and homogenizer have gaps for the passage of material therethrough, the width of which is controlled by yieldable pressure.

The characteristics of satin white treated by either of the above methods are very similar, and the two methods may be said to produce material which may be considered to be substantially identical from a commercial standpoint.

The preponderating effect of such treatment is to reduce the size of the oversize and the reduced oversize thus gives an increased percentage of intermediate particles and to a lesser degree may give a very slightly increased amount of ultimate particles produced from the breaking down of the oversize. However this later increase is not of substantial amount. Likewise there is a tendency for the larger intermediate particles to be reduced to smaller intermediate particles. On the other hand there is no perceptible reduction of the ultimate, and hence there is no production of excessively fine crystalline material such as occurs during the grinding mill operation. Moreover, by this treatment the color (whiteness) of a satin white is substantially unaffected, a point of very great importance, as the economic value of satin white is greatly influenced by its color. It will be noted that by the treatment I employ no part of the satin white is either temporarily or permanently separated therefrom.

It will thus be seen that the treatment above referred to produces satin white of characteristics different from any heretofore produced and satin white so treated is chiefly characterized by the fact that its particle size distribution has been limited in extent owing to the reduction of the larger particle sizes. Because the particle size distribution is thus restricted and the particle sizes made more nearly homogeneous, satin white so treated and/or possessing the above described characteristics I term "homogenized satin white".

Although not so desirable from the standpoint of quality, in some cases for economic reasons it is not feasible to carry the treatment of satin white so far as to completely eliminate the oversize and in certain cases results commercially satisfactory in a degree have been secured by the reduction of only a portion of the oversize. So treated satin white may, however, still be termed "homogenized satin white" because as a matter of fact the larger oversize are the first ones to be reduced, thus the range of particle size distribution has been restricted, the number of individual oversize particles has been reduced, and thus a larger percentage of the total particles of the satin white are more nearly alike in size than before treatment.

I have found that paper coated with homogenized satin white (mixed with a suitable adhesive, of course, such as casein and with or without other mineral pigments as desired) is much more uniform in finish, in certain instances can be made with less adhesive, thereby having the double advantage of more economical production and higher surface gloss, shows less tendency to dust than does paper coated with ordinary satin white, and prints more evenly and uniformly.

It will thus be apparent that my novel homogenized satin white which may be produced relatively inexpensively will result in the production of improved quality coated paper without substatinal price increase.

Instead of treating the satin white itself by either of the above two methods, I have found it possible in certain cases to treat the base from which the satin white is to be manufactured prior to the manufacture of the satin white, and find that this treatment produces a satisfactory homogenized satin white.

Where I use the word "paper" herein I use it in the broad sense to include products of manufacture of all types and of all weights and thicknesses which contain as an essential constituent a considerable amount of prepared fiber and which are capable of being produced on a Fourdrinier, cylinder, or other forming, felting, shaping or molding machine; and by "coated paper" I mean any one of these products which is coated.

While I have described in detail the preferred embodiments of my invention is to be understood that my invention may be varied considerably within the limitations required by the disclosure of the prior art without departing from the spirit of my invention or the scope of the subjoined claims.

I claim:

1. The method of producing improved satin white from satin white having oversize, intermediate and ultimate particles, which comprises substantially reducing the proportion by weight of particles exceeding .001" in size, and substantially correspondingly increasing the proportion by weight of intermediate particles while maintaining the proportion by weight and the size of ultimate particles substantially unchanged, with respect to the satin white employed in producing said improved satin white, whereby the total weight of said improved satin white will be substantially the same as said employed satin white.

2. The method of producing improved satin white from satin white having oversize, intermediate and ultimate particles, which comprises substantially eliminating particles exceeding .001" in size, maintaining the ultimate particles at substantially the same size as the ultimate particles in the satin white employed in producing said improved satin white, and substantially increasing the proportion of intermediate to ultimate particles with respect to the proportion of the intermediate to ultimate particles in said employed satin white, while maintaining the total weight of said improved satin white substantially the same as said employed satin white.

3. The method of producing coated paper comprising fibrous body stock and a coating comprising adhesive and improved satin white produced from satin white having oversize, intermediate and ultimate particles, which comprises substantially reducing the proportion by weight of particles exceeding .001" in size, and substantially correspondingly increasing the proportion by weight of intermediate particles, while maintaining the porportion by weight and the size of ultimate particles substantially unchanged, with respect to the satin white employed in producing said improved satin white, whereby the total weight of said improved satin white will be substantially the same as said employed satin white, and applying said improved satin white and said adhesive to said fibrous body stock.

4. The method of producing coated paper comprising fibrous body stock and a coating comprising adhesive and improved satin white produced from satin white having oversize, intermediate and ultimate particles, which comprises substantially eliminating particles exceeding .001" in size, maintaining the ultimate particles at substantially the same size as the ultimate particles in the satin white employed in producing said improved satin white, and substantially increasing the proportion of intermediate to ultimate particles with respect to the proportion of the intermediate to ultimate particles in said employed satin white, while maintaining the total weight of said improved satin white substantially the same as said employed satin white, and applying said improved satin white and said adhesive to said fibrous body stock.

5. Improved satin white produced from satin white having oversize, intermediate and ultimate particles, characterized by the fact that the proportion by weight of particles exceeding .001" in size is substantially reduced, the proportion by weight of intermediate particles is substantially correspondingly increased, and the proportion by weight and the size of ultimate particles are substantially unchanged, with respect to the satin white employed in producing said improved satin white, the total weight of said improved satin white being substantially the same as said employed satin white.

HAROLD ROBERT RAFTON.